(12) United States Patent
Rice et al.

(10) Patent No.: US 8,559,408 B2
(45) Date of Patent: Oct. 15, 2013

(54) SYSTEMS, METHODS, AND APPARATUS FOR COMMUNICATING THE STATE OF A WIRELESS USER DEVICE IN A WIRELESS DOMAIN TO AN APPLICATION SERVER IN AN INTERNET PROTOCOL (IP) DOMAIN

(75) Inventors: Robert M. Rice, Carrollton, TX (US); Payam Maveddat, Plano, TX (US); Gerardo Delgadillo, Frisco, TX (US)

(73) Assignee: BroadSoft M6, LLC, Gaithersburg, MD (US)

( * ) Notice: Subject to any disclaimer, the term of this patent is extended or adjusted under 35 U.S.C. 154(b) by 1159 days.

(21) Appl. No.: 11/963,117

(22) Filed: Dec. 21, 2007
(Under 37 CFR 1.47)

(65) Prior Publication Data
US 2008/0186929 A1 Aug. 7, 2008

Related U.S. Application Data

(60) Provisional application No. 60/876,356, filed on Dec. 21, 2006.

(51) Int. Cl.

| | |
|---|---|
| *H04W 4/00* | (2009.01) |
| *H04L 12/66* | (2006.01) |
| *H04L 12/58* | (2006.01) |
| *H04J 3/22* | (2006.01) |
| *H04B 7/00* | (2006.01) |
| *H04M 3/42* | (2006.01) |

(52) U.S. Cl.
USPC .......... 370/338; 370/352; 370/466; 455/41.2; 455/417; 455/412.1

(58) Field of Classification Search
USPC .......................... 455/41.2, 417; 370/352, 466
See application file for complete search history.

(56) References Cited

U.S. PATENT DOCUMENTS 6,421,424 B1  7/2002  Creamer et al.
6,519,228 B1  2/2003  Creamer et al.
(Continued)

FOREIGN PATENT DOCUMENTS

WO  WO 2005/125235 A2  12/2005

OTHER PUBLICATIONS

Notification of Transmittal of the International Search Report and the Written Opinion of the International Searching Authority, or the Declaration for International Application No. PCT/US07/26173 (May 7, 2008).

(Continued)

*Primary Examiner* — Ian N Moore
*Assistant Examiner* — Kiet Tang
(74) *Attorney, Agent, or Firm* — Jenkins, Wilson, Taylor & Hunt, P.A.

(57) ABSTRACT

Systems, methods, and computer program products communicating the state of a wireless user device in a wireless domain to an application server in an internet protocol (IP) domain are disclosed. According to one aspect, a system for communicating the state of a wireless user device in a wireless domain to an application server in an Internet protocol domain includes a wireless user device configured to operate in a wireless domain and configured to detect a change of its state, and, in response to detecting the change of state, to send a message service message, the message service message containing status information indicating a current state of the wireless user device. The system also includes an application server configured to operate in the IP domain and for receiving the status information indicating a state of the wireless user device and for providing at least one service to the wireless user device based on the current state of the wireless user device.

19 Claims, 6 Drawing Sheets

(56) References Cited

U.S. PATENT DOCUMENTS

| | | |
|---|---|---|
| 6,795,701 B1 | 9/2004 | Baker et al. |
| 7,043,231 B2* | 5/2006 | Bhatia et al. ............... 455/412.1 |
| 2002/0167906 A1 | 11/2002 | La Porta et al. |
| 2005/0197110 A1* | 9/2005 | Hasan et al. ................. 455/417 |
| 2005/0238048 A1* | 10/2005 | Delaney et al. ............... 370/466 |
| 2007/0032194 A1* | 2/2007 | Griffin .......................... 455/41.2 |
| 2009/0103520 A1* | 4/2009 | Begall et al. ................. 370/352 |

OTHER PUBLICATIONS

Communication of European publication number and information on the application of Article 67(3) EPC for European Patent No. 2119258 (Oct. 21, 2009).

"Third Generation Partnership Project; Technical Specification Group Core Network and Terminals; Technical Realization of the Short Message Service (SMS) (Release 6)," 3GPP TS 23.040 v.6.7.0, (Mar. 2006).

* cited by examiner

SYSTEMS, METHODS, AND APPARATUS FOR COMMUNICATING THE STATE OF A WIRELESS USER DEVICE IN A WIRELESS DOMAIN TO AN APPLICATION SERVER IN AN INTERNET PROTOCOL (IP) DOMAIN

RELATED APPLICATIONS

This application claims the benefit of U.S. Provisional Patent Application Ser. No. 60/876,356, filed Dec. 21, 2006; the disclosure of which is incorporated herein by reference in its entirety.

TECHNICAL FIELD

The subject matter described herein relates to methods and systems for synchronization of wireless user devices to application servers not in the wireless domain. More particularly, the subject matter described herein relates to systems, methods, and apparatus for communicating the state of a wireless user device in a wireless domain to an application server in an internet protocol (IP) domain.

BACKGROUND

The Internet protocol multimedia subsystem (IMS) network architecture is defined by the Third Generation Partnership Project (3GPP) as a new mobile network infrastructure that enables the convergence of data, speech, and mobile network technology via an IP-based infrastructure. IMS is designed to deliver Internet-based content to mobile phone users. IMS carries signaling and bearer traffic over the IP layer and operates as a routing engine or session control application that matches user profiles with appropriate call/session-handling servers, and then routes the call or session to the appropriate destination. The architecture includes the capability to add, modify, or delete sessions during an existing multimedia session, or a wireless call. This opens possibilities of "blended" services that involve simultaneous voice, data, and multimedia not only for wireline but for wireless calls as well. Application servers are nodes on the IMS network that provide these services.

One service made possible by the IMS architecture is conference calling, in which the traditional concept of a call as a connection between two endpoints, e.g., caller and callee, is extended by allowing multiple parties to be connected to or disconnected from the call. For example, the IMS network may include a node, such as an application server, that provides the conference call service. All parties to the conference call are routed through this node, which acts conceptually like a simple repeater: if the application server receives a packet, representing a portion of voice data for example, from any party to the conference call, the application server sends copies of that packet to every other party to the conference call. Adding a party to the call is as conceptually simple as adding another name to the list of parties to the call. Both wireless and wireline users may be parties to the call, since calls from both types of users are ultimately converted to packets in the core IMS network.

Other services enabled by the IMS architecture include presence services, which provide presence information for a user or subscriber of a network. Presence information is a status indicator that conveys ability and willingness of a user to communicate. For example, a user's client, such as a cell phone, personal digital assistant (PDA), mobile computer, etc., may provide presence information to a presence server on the IMS network. The presence server determines the presence state of the user, potentially making that information available to others, who may poll the presence server to determine the state of the user or who have requested that the presence server notify them of any change in the user's presence state. Presence information is widely used for instant messaging and voice over IP, to determine availability of users in a "friend's list", for example.

However, one of the challenges facing IMS for providing blended services is that there is not an established way to pass the status of a mobile end device in a wireless domain directly to an application server in an IP domain. This hinders an application server from providing those services, such as presence services, call forwarding, auto attendant services, and others, that depend on the device status, to the wireless client.

Accordingly, there exists a need for systems, methods, and apparatus for communicating the state of a wireless user device in a wireless domain to an application server in an internet protocol (IP) domain.

SUMMARY

According to one aspect, the subject matter described herein includes a system for communicating the state of a wireless user device in a wireless domain to an application server in an Internet protocol (IP) domain. The system includes a wireless user device configured to operate in a wireless domain, configured to detect a change of its state, and, in response to detecting the change of state, to send a message service message, the message service message containing status information indicating a current state of the wireless user device. As used herein, the term "messaging service message" refers to any type of message normally used to communicate user data between users, including short message service messages, multimedia message service messages, and instant messaging messages. The system also includes an application server configured to operate in the IP domain and for receiving the status information indicating a state of the wireless user device and for providing at least one service to the wireless user device based on the current state of the wireless user device.

According to another aspect, the subject matter described herein includes a method for communicating the state of a wireless user device in a wireless domain to an application server in an Internet protocol domain. A wireless user device configured to operate in a wireless domain detects a change of its state and sends a message service message that includes status information indicating a state of the device to an application server configured to operate in an Internet protocol (IP) domain. The application server receives the status information indicating a state of the wireless user device and provides at least one service to the wireless service device based on the state of the wireless user device.

The subject matter described herein for communicating the state of a wireless user device in a wireless domain to an application server in an internet protocol (IP) domain may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Systems, methods, and apparatus for communicating the state of a wireless user device in a wireless domain to an application server in an internet protocol (IP) domain are disclosed herein. Messaging service messages, which are normally used to communicate information between users, are here used instead to communicate the status of a wireless user device in a wireless domain to an application server in an IP domain.

The wireless user device may include an application that detects a change of state of the wireless user device and communicates a status message to an application or feature server via a signaling or data channel in the wireless domain and via packet communications in the IP domain. The message may go through intermediate signaling, routing, and gateway nodes as needed before arriving at the application server. The application server uses the accurate device status information to provide services, like call forwarding and presence services, to the wireless user device. The messages may be sent automatically from the wireless user device to the application server without the user's knowledge or initiation.

Figure 1:
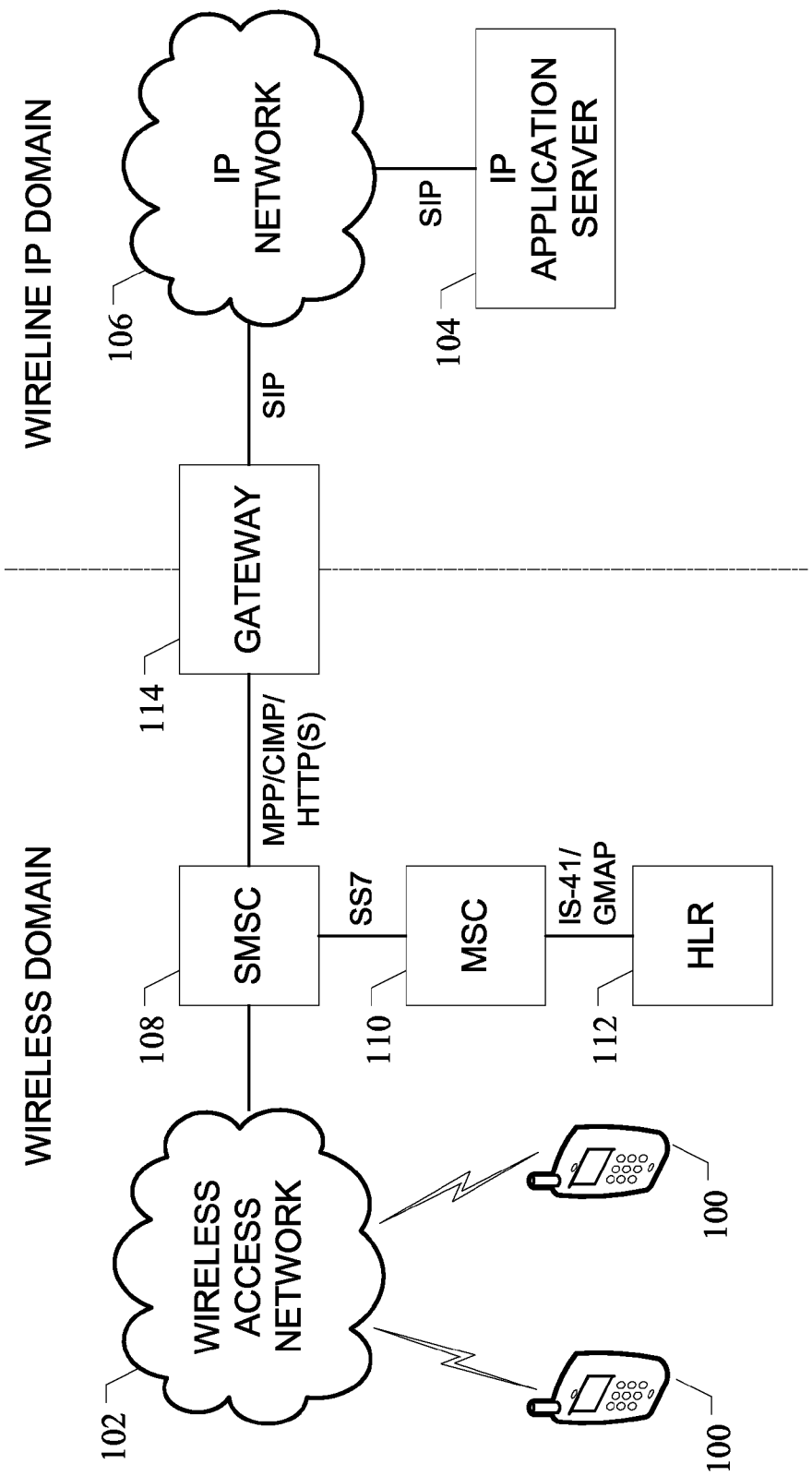
FIG. 1 is a block diagram illustrating a system for communicating the state of a wireless user device in a wireless domain to an application server in an Internet protocol domain according to an embodiment of the subject matter described herein.

FIG. 1 is a block diagram illustrating a system for communicating the state of a wireless user device in a wireless domain to an application server in an Internet protocol domain according to an embodiment of the subject matter described herein.

The system may include a wireless user device 100 for communicating in a wireless domain 102. Wireless user device 100 is configured to detect a change of its state, and in response to detecting the change of state, send a message containing information about its status to an application server 104 in an IP domain 106.

Wireless user device 100 may be a mobile station (MS), an end-user equipment (UE), a mobile phone, a cellular phone, a personal digital assistant (PDA), a mobile computing device, or other mobile computing platform capable of communicating a status message via a wireless network. Example messages include messaging service messages, such as SMS or multimedia messaging service (MMS) messages.

Changes of state that may trigger generation of a status message include device power on/off, sending or receiving a call, pressing a button on the device, call termination by a party to the call, sending or receiving a voice mail, text message, media component, a change of state of an application running on the device, the receipt of a message from an application server, or any other event the notification of which may be useful to an application server that is providing a service.

In one embodiment, user interaction is not required to send the status message. One or more messages may be sent automatically upon a state change, and the user may be unaware that status messages are being sent. The type of device status messages and frequency at which the status messages are being sent depend upon the needs and uses of the device state information. The status message may include: information about the calling or called party, such a party's telephone number, directory number, mobile directory number, caller ID number and/or name, phone book number and/or name, or other information identifying a party or associated with a party; information about the call, such as state of the call or event type, whether the call was sent or received, connected or disconnected, or any change of state in a basic call state model state machine; information about the message itself, such as a message sequence number or timestamp; message about the device, such as device type, device ID, interface type, or interface ID; or any other information that could be provided by the device for use by the application server.

Wireless domain 102 may be a global system for mobile communications (GSM) network, an enhanced data rates for GSM evolution (EDGE) network, a code division multiple access (CDMA) network, a global packet radio service (GPRS) network, an enhanced GPRS (EGPRS) network, a packet data service node (PDSN) network, a common channel signaling network (CCSN), a public packet-switched network (PPSN), a wireless local area network (WLAN), or some combination of the above.

Application server 104 may be a SIP application server or other node for maintaining state information associated with wireless user device 100 and providing service features to wireless user device 100 based on the current state of wireless user device 100. Application server 104 may provide conference calling, presence, or other services or features to wireless user device 100. Application server 104 may receive the message containing status information indicating a current state of wireless user device 100, and, in response, provide at least one service to wireless user device 100 based on its current state. Application server 104 may update the maintained state information associated with wireless user device 100 to indicate the current state of the device based on the status information.

A message in a network may need to pass through more than one network entity before reaching the message destination. In one embodiment, the system may include a short message service center (SMSC 108), also referred to as a GSM service center, for handling SMS messages. The format and operation of SMS messages in a 3G network are described in the 3GPP technical specification TS 23.040V.6.7.0 (2006-03), titled "Technical realization of the Short Message Service (SMS) (Release 6)", incorporated by reference herein in its entirety. Typically, messages sent from a mobile phone reach the network's SMSC first, and the SMSC will forward the SMS message toward the message destination. In one embodiment, SMSC 108 may receive the status message from wireless user device 100, determine routing information for the message, such as the address of application server 104, and forward the message to application server 104 according to the routing information determined.

The main function of an SMSC or its equivalents in other network architectures is to route SMS messages and regulate the process. If the recipient is unavailable, for example, if wireless user device 100 is switched off, SMSC 108 will store the SMS message, and forward the message when the recipient becomes available again. Very often an SMSC is dedicated to handle the SMS traffic of one wireless network. A network operator usually manages its own SMSC(s) and locates them inside its wireless network system. However, it is possible for a network operator to use a third-party SMSC that is located outside the wireless network system. In addition, a message may travel through more than one SMSC, such as a message that goes from one provider's network to another provider's network.

Wireless user device 100 must know the address of SMSC 108 in order to use SMS messaging. Typically an SMSC address is an ordinary phone number in the international format, such as an E.164 directory number. A mobile phone may have a menu option that can be used to configure the SMSC address. Normally, the SMSC address is pre-set in the SIM card by the wireless network operator.

In one embodiment, the system may include a mobile switching center (MSC 110) or its equivalent in other network architectures for providing telephony and switching services to mobile subscribers. In one embodiment, SMSC 108 and MSC 110 may be separate network entities, while in another embodiment, SMSC 108 and MSC 110 may be co-located, or even considered part of the same node. In either embodiment just described, SMSC 108 may query MSC 110 to determine the routing information for the message. In yet another embodiment, the system may include a home location register (HLR 112), which maintains a database containing information about subscribers to a mobile network, commonly called subscriber profiles. HLR 112 may also maintain service profiles for visiting subscribers, although visitor profiles are often handled by another entity called a visitor location register (VLR), not shown. MSC 110 may query HLR 112 to determine the location of application server 104, and, based on that information, determine the appropriate gateway, such as gateway node 114, to which to the message should be routed. MSC 110 and/or SMSC 108 may use the subscriber information supplied by HLR 112 to authenticate and register the subscriber.

In one embodiment, the system may include a gateway node 114 for enabling communication between wireless domain 102 and IP domain 106. Gateway node 114 may convert the message from the first format, such as a format used for messages in wireless domain 102, into a second format, such as a format used for messages in IP domain 106. In one embodiment, gateway node 114 may be a short message service gateway (SMSG) for converting SMS messages in a format used by second generation (2G) and third generation (3G) wireless networks into SMS messages in a format used in IP network. In an alternative embodiment, gateway node 114 may be an IMS node. Gateway node 114 may be any node that converts messaging service messages from a format used by a wireless domain into a format used by an IP domain and vice versa.

Message formats used by wireless networks include signaling system 7 (SS7) protocol messages, short message peer-to-peer protocol messages, computer interface to message distribution (CIMD) protocol messages, hyper text transport protocol (HTTP) and hyper text transport protocol secure (HTTPS) messages, short message service center (SMSC) format messages, or other formats used to send messages in a wireless domain. Message formats used by IP networks include session initiation protocol (SIP) messages, session description protocol (SDP) messages, or other formats used to send messages in an IP domain.

Figure 2:
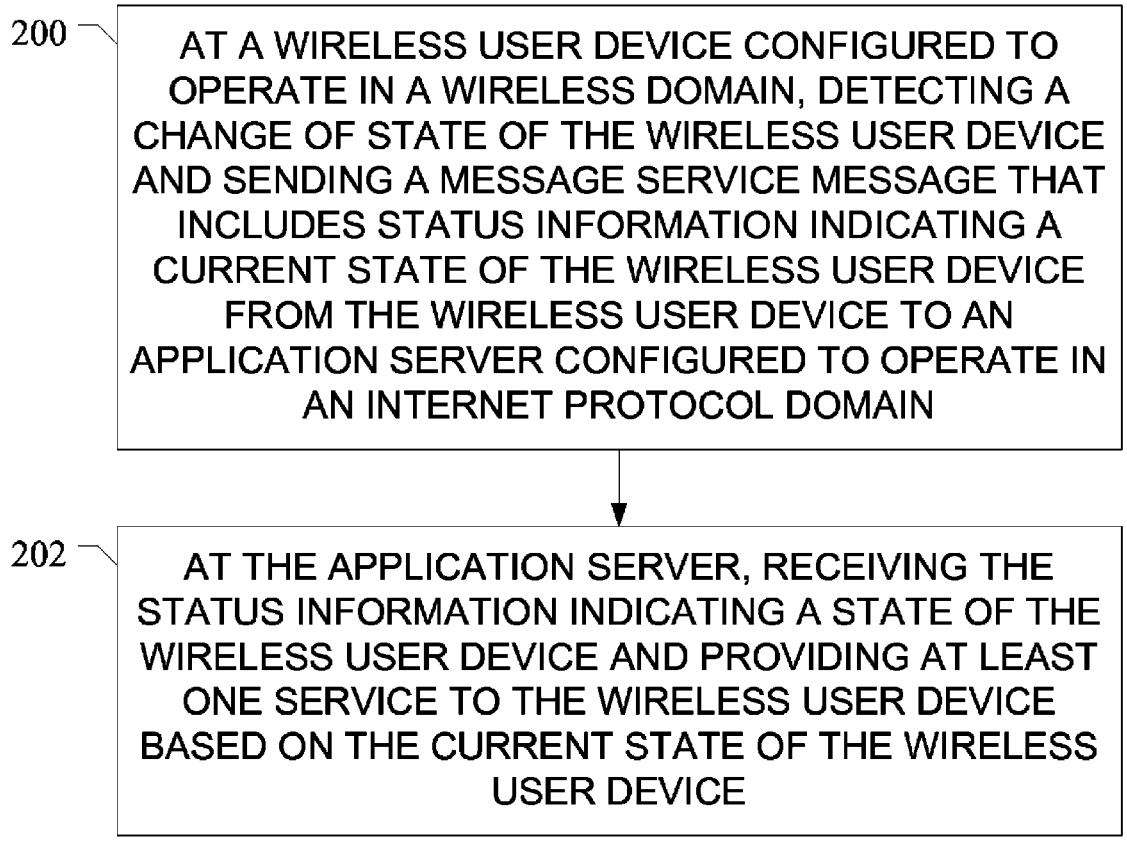
FIG. 2 is a flow chart illustrating an exemplary process for communicating the state of a wireless user device in a wireless domain to an application server in an Internet protocol domain according to an embodiment of the subject matter described herein.

FIG. 2 is a flow chart illustrating an exemplary process for communicating the state of a wireless user device in a wireless domain to an application server in an Internet protocol domain according to an embodiment of the subject matter described herein.

At block 200, a wireless user device configured to operate in a wireless domain detects a change of its state. The wireless user device sends a message service message that includes status information indicating a current state of the wireless user device from the wireless user device to an application server configured to operate in an internet protocol domain. For example, wireless user device 100 may be a combination PDA+phone+music player that, upon being turned on, powered up, or otherwise activated, sends an SMS message to application server 104 running a presence service, the message indicating that the user is now on-line. Later, wireless user device 100 may detect that the user is using wireless user device 100 to listen to music, and has set a user preference indicating that while the user is listening to music, the user does not want to be disturbed by incoming calls, emails, or messages. In this example, wireless user device 100 may send an SMS message to application server 104 indicating a "do not disturb" state for the user.

In one embodiment, the SMS message may be received at a gateway, such as gateway node 114, for passing communication between the wireless domain and the IP domain. Gateway node 114 may convert the message from one format into another, such as from a wireless domain protocol into an IP domain protocol and send the message in the second format to an Internet protocol (IP) domain. Using one of the examples above, gateway node 114 may be an SMSG that receives the "listening to music, don't interrupt" message from wireless user device 100 as an SMS message sent via a data channel in an EDGE network, converts the message to SIP format, and forwards it to application server 104 via a public packet-switched network.

At block 202, the destination node receives the status information indicating a state of the wireless user device and provides at least one service to the wireless service device based on the state of the wireless user device. For example, application server 104 may receive the message in SIP format and determine from the status information (i.e., the "listening to music, do not interrupt" message) that the wireless user device 100 is in a "do not disturb" state. In this state, for example, text and email may be stored without being forwarded, the user's presence indicator may show "do not disturb", "not available", or similar message, and calls to the user may be blocked with a busy signal or "number temporarily out of service" message.

Table 1, below, contains a list of example events that may trigger a status message to be sent from wireless user device 100, along with examples of status information that may be included in the status message.

TABLE 1

Trigger Events

| TRIGGER EVENT | MDN | TIMESTAMP | EVENT TYPE | OTHER STATUS INFORMATION SENT |
|---|---|---|---|---|
| Power On/ Registration | ● | ● | ● | |
| Mobile Originate | ● | ● | ● | Dialed Number |
| Mobile Terminate | ● | ● | ● | Caller ID number and name if available. If caller ID does not provide name, then provide name from matching entry in phone book if available. Indicate where name came from (Caller ID or Phone Book) |
| Pressing TALK/ SEND after call waiting notification | ● | ● | ● | Caller ID number and name if available. If caller ID does not provide name, then provide name from matching entry in phone book if available. Indicate where name came from (Caller ID or Phone Book) |
| Pressing END to terminate any active call leg | ● | ● | ● | |
| Far end call terminates | ● | ● | ● | |
| Pressing TALK/ SEND button while in active call leg | ● | ● | ● | Dialed Number |
| Power Down | ● | ● | ● | |
| Change of cell | ● | ● | ● | Geographic location |
| Application Trigger | ● | ● | ● | e.g., name of song/video being played, gaming information, etc. |

In one embodiment, a power on or power off event may trigger a series of actions taken by wireless user device 100. For example, turning on a cell phone may trigger a sequence including system reset or reboot, power on self-tests, etc., followed by an attempt to register the cell phone in a detected wireless network 102. In such an embodiment, the cell phone's power on sequence may include the additional step of sending an SMS message or other messaging service message to the application server 104 to indicate that the device is now on. Similarly, the cell phone's power off sequence might include as a first action sending a status message to application server 104 to indicate that the device will soon be off.

In another embodiment, application server 104 may send, or attempt to send, messages to wireless user device 100 in a polling fashion in order to determine whether wireless use device 100 is still active, and wireless user device 100 may be configured to respond to the poll message with a status message. In this manner, application server 104 may be able to perform early detection of unavailability of wireless user device 100 in a situation where the device was unable to send out a "going out of service" message in time, such as when a device leaves a service area, has a battery failure, is broken, etc.: e.g., if application server 104 stops getting a response from wireless user device 100, it may justifiably assume that wireless user device 100 is no longer available, and application server may update the state information associated with that device.

A variety of other status messages are within the scope of the subject matter described herein. For example, a hand-held gaming device may send application-specific status, such as information associated with the game or the user's character in the game, to a gaming server. In addition, synergistic combinations of services can be achieved in a wireless user device configured to make use of multiple services. For example, if wireless user device 100 supports a presence service and can also play music, it might send messages to the presence server 104 indicating the song currently being played, how the user rated the song, the user's top 10 favorite songs, and so on. If wireless user device 100 has global positioning system (GPS) capability, the user's presence information may include current geographic position, latitude and longitude, city, state, zip code, etc. Any use of messaging service messages to send device status information to an application server, rather than to send messages from one user to another user, is also considered to be within the scope of the subject matter described herein.

Figure 3:
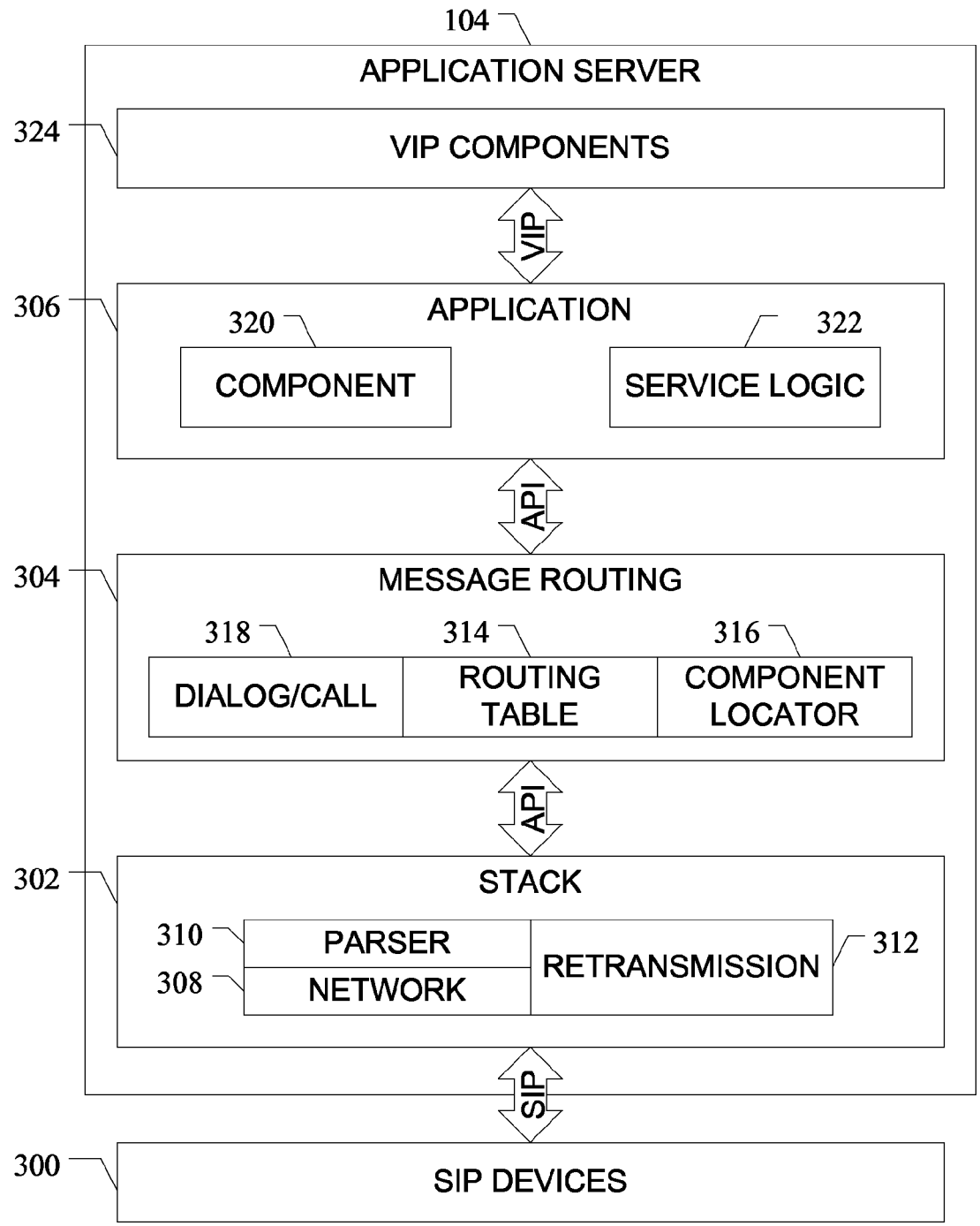
FIG. 3 is a block diagram illustrating in more detail an exemplary SIP application server according to an embodiment of the subject matter described herein.

FIG. 3 is a block diagram illustrating in more detail an exemplary SIP application server according to an embodiment of the subject matter described herein. The processing of a status message in SIP format will now be described with reference to FIG. 3. As an overview, when a SIP message is sent from a SIP device 300 and received by a SIP application server 104, the message may go through a protocol stack layer 302, to a message routing layer 304, and then to an application layer 306 that performs the call feature processing. In one embodiment, APIs, rather than proprietary protocol messages, are used to communicate between the layers. This creates a flexible interface and better performance because using proprietary protocols generally requires that the messages be serialized and de-serialized between layers, while using APIs does not. The structure and operation of each of these layers will now be described in turn.

In one embodiment, a SIP message received by application server 104 is first processed by application layer 306. The message may be received at a network interface 308, parsed by a parser 310, and validated against the SIP protocol. The message may be converted to an internal message if necessary and sent to message routing layer 304; otherwise the message may be processed for retransmission 312 back to the same or another SIP device 300.

In one embodiment, message routing layer 304 locates the correct component of application layer 306 to which the message should be sent, and may provide mechanisms to statically or dynamically bind components to a routing table 314. A component is a model of a device, such as a SIP phone, a media gateway, and a media gateway server. At the system startup time, components may be loaded into a component table 316. In one embodiment, the operation of message routing is a 3-level table lookup. A first lookup, into a dialog/call table 318, may be performed to see if the component is already associated with an in-progress session/dialog. If not, a second lookup, into routing table 314, may be performed to see if the component is active. If not, a third lookup, into the larger, in-memory component table 316, may be performed to see if the component is supported by the application. If a component is found, the message may be passed to the correct component in application layer 306.

Typically, application layer 306 is the core of an application server that is responsible for managing call flows, service features and feature interaction. In one embodiment, application layer 306 consists of two sub-layers, the component sub-layer 320 and the service logic sub-layer 322. As logical representations of physical and virtual entities, components may perform call control, service logics and related functions. The components may be stored in a static VIP components database 324, loaded into memory at the system startup and may be dynamically reloaded on an as-needed basis. Components may communicate with each other via internal events. These internal events can be easily mapped into or alternatively implemented as standard SIP or Q.931 messages. Example events include INITIATE, PROGRESS, DIGIT, CONNECT, ACTIVE, IDLE, REDIRECT, PRIVATE, MIRROR. These internal events may create and modify the state of calls.

There are three broad categories of components. A generic component performs functions common to all service features. For example, a server component may be responsible for creating/loading/deleting other components and maintains network connections to the redundant peer, to database agents, to gateways, etc. The server component is typically the very first component loaded into the system. Another example is the static call component, which may be a system-wide instance responsible for routing messages between components, codec negotiation, collection of CDR related data, call transfer, and maintaining a list of all established calls and related caller and callee information. Application-specific components may implement application-specific features. Some examples of these components include a hosted PBX component, which represents a class of PSX service and includes PBX features like directory, group pickup, line, outgoing dial, phone, and phone configurator; a unified messaging component that has other components like voice mail box and voice mail server; and a conferencing component that includes conference group and meet-me conference. Subscriber specific components may implement subscriber-specific features, and are described in more detail in FIG. 4, below.

Figure 4:
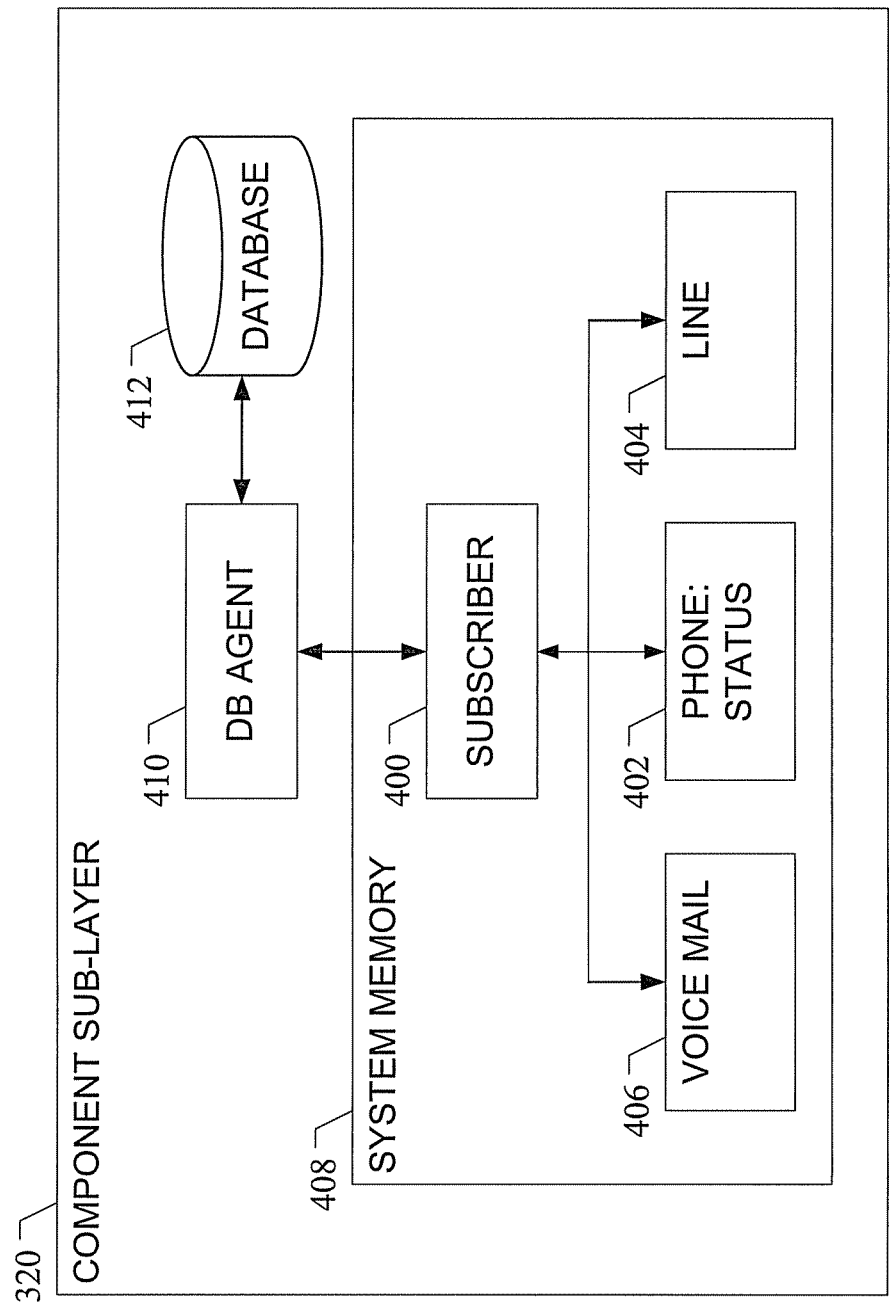
FIG. 4 is a block diagram illustrating in more detail an exemplary component sub-layer according to an embodiment of the subject matter described herein.

FIG. 4 is a block diagram illustrating in more detail an exemplary component sub-layer according to an embodiment of the subject matter described herein. Component sub-layer 320 may create a subscriber component 400 that models a subscriber with data such as subscriber address, names, phone number, billing data, etc. In one embodiment, the subscriber component may be associated with other components, such as a phone component 402, a line component 404, and a voice mail component 406.

Phone component 402 may emulate an end device phone with properties including button, protocols, display, codec supported at phone, states of the phone (active, idle, etc) and a reference to active call. Line component 404 may emulate a line terminating at an end device like a phone. This component typically manages features involving 3rd party software. For example, the component may include a call controller that is responsible for 3rd party call control application (click to dial on Outlook; click on web to transfer the call) and a personal directory for call ID lookup and call forward set up. This component not only emulates the communication link but may also implement the service feature associated with the subscriber. Thus it is this component that is typically associated with service logic sub-layer 322 to implement call control and service features. Voice mail component 406 may model the voice mail box associated with a subscriber with attributes like voice mail messages, associated time stamps, etc.

A wireless subscriber can be either provisioned ahead of time at application server 104 or provisioned on demand as the subscriber roams into the IP domain, such as IP domain 106, that is served by application server 104. The subscriber component associated with a subscriber may be loaded into system memory 408 once triggered by an event like call setup, call termination or a device status update like the one described in this disclosure.

In one embodiment, when a status update message is sent from message routing layer 304 to application layer 306, the message may be routed to DB agent 410. DB agent 410 may send an update message to phone component 402 via subscriber component 400. Phone component 402 may then update the device status as requested. In this manner, application server 104 knows the state of wireless user device 100, such as whether wireless user device 100 is ON or OFF, for example. Thus, if a call forward service is later invoked with wireless user device 100 as the forward-to target, the device status in phone component 402 is checked. If the status is ON, the call is forwarded to wireless user device 100. Otherwise, the call is forwarded to the subscriber's voice mail, if it is so provisioned.

FIGS. 3 and 4, above illustrate one embodiment of an application server 104. Alternative embodiments for receiving messaging service messages containing status information associated with wireless user device 100 and updating the state associated with that device based on the content of the status messages include, but are not limited to, a SIP proxy server and an application server running java servlets or applets.

Figure 5:
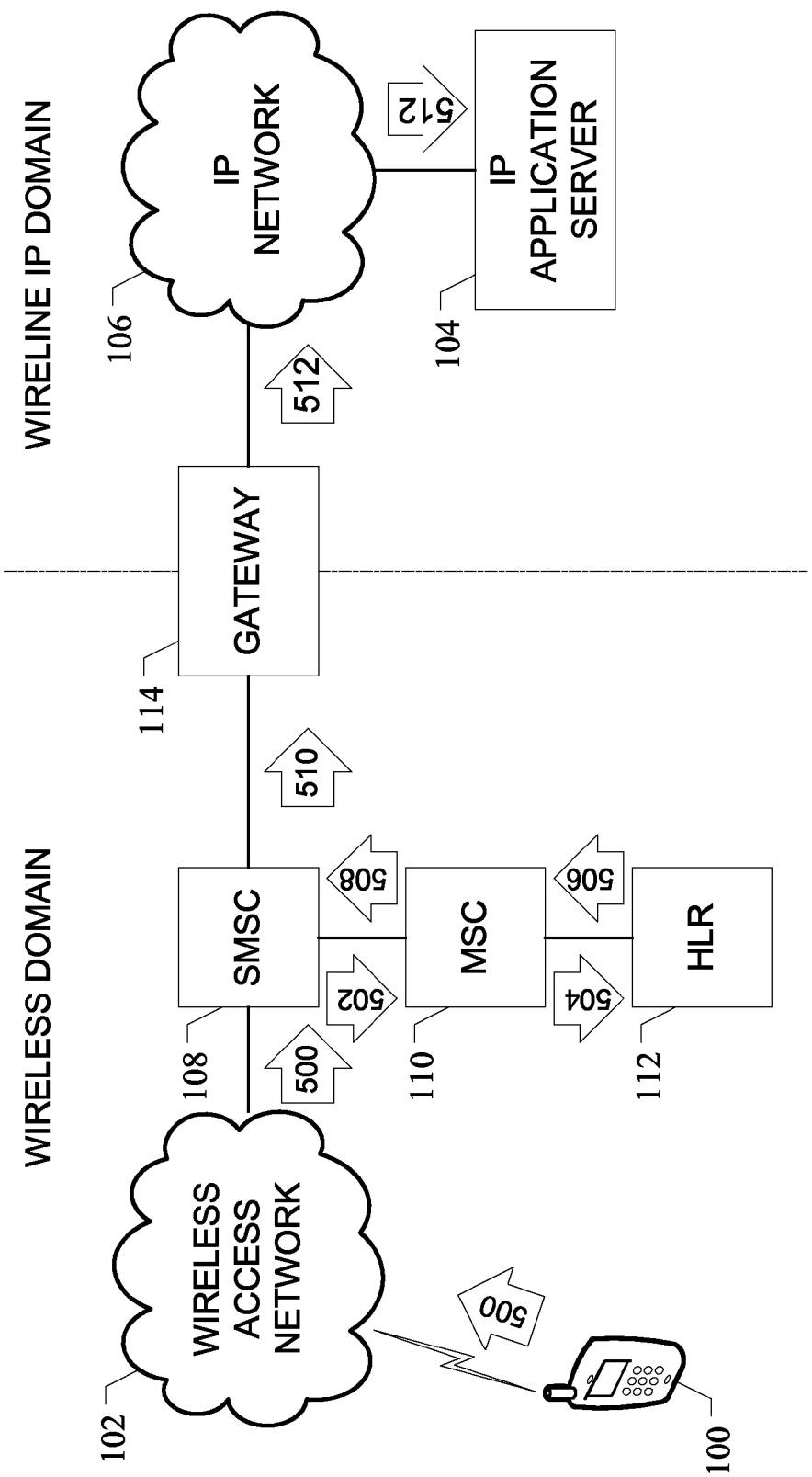
FIG. 5 is a message flow diagram illustrating messages communicated during an exemplary process for communicating the state of a wireless user device in a wireless domain to an application server in an Internet protocol domain according to an embodiment of the subject matter described herein.

FIG. 5 is a message flow diagram illustrating messages communicated during an exemplary process for communicating the state of a wireless user device in a wireless domain to an application server in an Internet protocol domain according to an embodiment of the subject matter described herein. Message 500 is a status message sent from wireless user device 100 in response to detecting a change of state. Message 500 is an SMS message that includes status information for wireless user device 100 and has as its intended destination application server 104. Message 500 is received by SMSC 108, which processes all SMS messages in wireless domain 102.

Message 502 is a query sent from SMSC 108 to MSC 110 to determine routing information for Message 500. MSC 110 may issue its own query, Message 504, to HLR 112. HLR 112 may respond to Message 504 with a query response message, Message 506. Upon receiving Message 506, MSC 110 may issue its response message to SMSC 108, Message 508, containing routing information for Message 500.

Upon receiving Message 508 and the routing information contained therein, SMSC 108 may forward the SMS status message, now labeled Message 510, to gateway node 114, which converts the SMS status message from a wireless format or protocol into a wireline format or protocol, and sends that message, Message 512, to application server 104 via IP domain 106.

Figure 6:
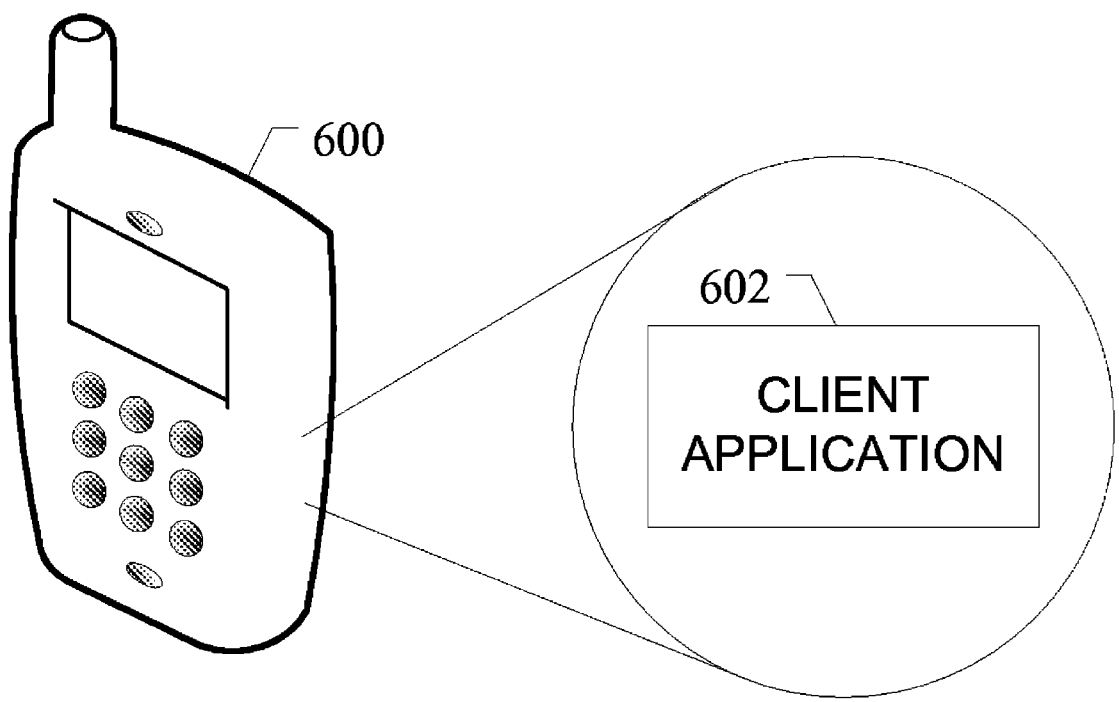
FIG. 6 is a block diagram illustrating an apparatus for communicating the state of a wireless user device in a wireless domain to an application server in an Internet protocol domain according to an embodiment of the subject matter described herein.

FIG. 6 is a block diagram illustrating an apparatus for communicating the state of a wireless user device in a wireless domain to an application server in an Internet protocol domain according to an embodiment of the subject matter described herein. In one embodiment, wireless user device 600 for communicating in a wireless domain and configured to send a message containing information associated with the state of device 600, includes a client application 602 that detects a change of state of device 600, and in response to detecting the change of state, instructs device 600 to send a message containing information associated with the state of device 600. Client application 602 may be an application, program, applet, or other executable operating on device 600. Client application 602 may be a component of, hosted by, or executing within the operating system of device 600.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for communicating the state of a wireless user device in a wireless domain to an application server in an Internet protocol (IP) domain, the system comprising:
   a wireless user device configured to operate in a wireless domain, configured to detect a change of its state, and, in response to detecting the change of state, to send a messaging service message to an Internet protocol multimedia subsystem (IMS) gateway node, the messaging service message containing status information indicating a current state of the wireless user device, wherein the messaging service message is one of a short message service (SMS) message or a multimedia messaging service (MMS) message, wherein the gateway node receives the message from the wireless domain in a first format and converts the message from the first format into a second format, wherein the first format is one of a signaling system 7 (SS7) format, a short message peer-to-peer (SMPP) format, a computer interface to message distribution (CIMD) format, a hypertext transport protocol (HTTP) format, a hyper text transport protocol secure (HTTPS) format, and a short message service center (SMSC) format and wherein the second format is one of a session initiation protocol (SIP) format, a session description protocol (SDP) format, and an Internet protocol (IP) format; and
   an application server configured to operate in the IP domain and for receiving, from the IMS gateway node, the status information indicating a state of the wireless user device and for providing at least one service to the wireless user device based on the current state of the wireless user device.

2. The system of claim 1 wherein the wireless user device comprises one of a mobile station (MS), a user equipment (UE), a mobile phone, a cellular phone, a personal digital assistant (PDA), a mobile computing device, and a mobile computing platform.

3. The system of claim 1 wherein the wireless domain comprises one of a global system for mobile communications (GSM) network, an enhanced data rates for GSM evolution (EDGE) network, a code division multiple access (CDMA) network, a global packet radio service (GPRS) network, an enhanced GPRS (EGPRS) network, a packet data service node (PDSN) network, a common channel signaling network (CCSN), a public packet switched network (PPSN), and a wireless local area network (WLAN).

4. The system of claim 1 wherein the status information includes at least one of information associated with a calling party, information associated with a called party, information indicating the state of the call, information associated with the message, information associated with the wireless user device, and information associated with an application on the wireless user device.

5. The system of claim 1 wherein the application server comprises a session initiation protocol application server.

6. The system of claim 1 wherein the message comprises a short message service (SMS) message and wherein the system comprises a short message service center (SMSC) for receiving the message from the wireless user device, determining routing information for the gateway node, and sending the message to the gateway node according to the determined routing information for the gateway node.

7. The system of claim 6 wherein the SMSC queries a mobile switching center (MSC) to determine routing information for the gateway node.

8. The system of claim 7 wherein the SMSC and the MSC are co-located in the same node.

9. The system of claim 7 wherein the MSC queries at least one of a home location register (HLR) and a visitor location register (VLR) to determine routing information for the application server.

10. The system of claim 1 wherein the gateway node comprises a short message service gateway (SMSG).

11. A method for communicating the state of a wireless user device in a wireless domain to an application server in an Internet protocol domain, the method comprising:
   at a wireless user device configured to operate in a wireless domain, detecting a change of state of the wireless user device and sending, via an Internet protocol multimedia subsystem (IMS) gateway node, a messaging service message that includes status information indicating a state of the wireless user device from the wireless user device to an application server configured to operate in an Internet protocol (IP) domain, wherein the messaging service message is one of a short message service (SMS) message or a multimedia messaging service (MMS) message, wherein the gateway node receives the message from the wireless domain in a first format and converts the message from the first format into a second format, wherein the first format is one of a signaling system 7 (SS7) format, a short message peer-to-peer (SMPP) format, a computer interface to message distribution (CIMD) format, a hypertext transport protocol (HTTP) format, a hyper text transport protocol secure (HTTPS) format, and a short message service center (SMSC) format and wherein the second format is one of a session initiation protocol (SIP) format, a session description protocol (SDP) format, and an Internet protocol (IP) format; and
   at the application server, receiving, from the IMS gateway node, the status information indicating a state of the wireless user device and providing at least one service to the wireless user device based on the state of the wireless user device.

12. The method of claim 11 wherein the wireless user device comprises one of a mobile station (MS), a user equipment (UE), a mobile phone, a cellular phone, a personal digital assistant (PDA), a mobile computing device, and a mobile computing platform.

13. The method of claim 11 wherein the wireless domain comprises one of a global system for mobile communications (GSM) network, an enhanced data rates for GSM evolution (EDGE) network, a code division multiple access (CDMA) network, a global packet radio service (GPRS) network, an enhanced GPRS (EGPRS) network, a packet data service node (PDSN) network, a common channel signaling network (CCSN), a public packet switched network (PPSN), and a wireless local area network (WLAN).

14. The method of claim 11 wherein the status information includes at least one of information associated with a calling party, information associated with a called party, information indicating the state of the call, information associated with the message, information associated with the wireless user device, and information associated with an application on the wireless user device.

15. The method of claim 11 wherein the application server comprises a session initiation protocol application server.

16. The method of claim 11 wherein sending the messaging service message includes sending a short message service (SMS) message to a short message service center (SMSC) and wherein the SMSC determines routing information for the application server and forwards the message according to the determined routing information for the application server.

17. The method of claim 16 wherein determining the routing information for the application server includes querying at least one of a mobile switching center (MSC), a home location register (HLR), and a visitor location register (VLR) to determine routing information for the application node.

18. The method of claim 11 wherein the gateway node comprises a short message service gateway (SMSG).

19. An apparatus for communicating the state of a wireless user device in a wireless domain to an application server in an Internet protocol domain, the apparatus comprising:
    a wireless user device configured to operate in a wireless domain and configured to send a messaging service message containing information indicating a current state of the device to an Internet protocol multimedia subsystem (IMS) gateway node, wherein the messaging service message is one of a short message service (SMS) message or a multimedia messaging service (MMS) message, wherein the gateway node receives the message from the wireless domain in a first format and converts the message from the first format into a second format, wherein the first format is one of a signaling system 7 (SS7) format, a short message peer-to-peer (SMPP) format, a computer interface to message distribution (CIMD) format, a hypertext transport protocol (HTTP) format, a hyper text transport protocol secure (HTTPS) format, and a short message service center (SMSC) format and wherein the second format is one of a session initiation protocol (SIP) format, a session description protocol (SDP) format, and an Internet protocol (IP) format; and
    a client application, on the wireless user device, for detecting a change of state of the device, and, in response to detecting the change of state, instructing the device to send the messaging service message containing information indicating the current state of the device to the IMS gateway node.

\* \* \* \* \*